United States Patent
Lee et al.

(10) Patent No.: US 10,921,253 B2
(45) Date of Patent: Feb. 16, 2021

(54) APPARATUS OF EVALUATING STABILITY OF LUMINESCENT MATERIAL AND METHOD OF EVALUATING THE SAME

(71) Applicant: SAMSUNG DISPLAY CO., LTD., Yongin-si (KR)

(72) Inventors: Yoonkyoo Lee, Yongin-si (KR); Taekyung Kim, Yongin-si (KR); Daeyup Shin, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 14 days.

(21) Appl. No.: 16/407,792

(22) Filed: May 9, 2019

(65) Prior Publication Data
US 2020/0088637 A1 Mar. 19, 2020

(30) Foreign Application Priority Data
Sep. 18, 2018 (KR) .................. 10-2018-0111165

(51) Int. Cl.
*G01N 21/64* (2006.01)
*G01N 27/30* (2006.01)

(52) U.S. Cl.
CPC ......... *G01N 21/643* (2013.01); *G01N 27/301* (2013.01)

(58) Field of Classification Search
CPC ............... G01N 21/643; G01N 21/301; G01N 2021/6432; G01N 21/6408; G01N 27/301; G01N 21/63
See application file for complete search history.

(56) References Cited

U.S. PATENT DOCUMENTS

| 5,799,682 A * | 9/1998 | Affleck ............. G01N 15/1404 137/14 |
| 6,699,717 B1 * | 3/2004 | Rao .................... G01N 21/6408 436/132 |
| 8,068,661 B2 | 11/2011 | Onushkin et al. |
| 8,288,722 B2 | 10/2012 | Hasegawa et al. |
| 8,518,236 B2 | 8/2013 | Roblin et al. |
| 2004/0159803 A1* | 8/2004 | Akselrod ............... G01T 1/105 250/581 |

(Continued)

FOREIGN PATENT DOCUMENTS

| CA | 982259 A * | 1/1976 | ............... F21K 2/08 |
| CN | 103499571 A * | 1/2014 | |

(Continued)

OTHER PUBLICATIONS

N. Lin et al., "Molecular Understanding of the Chemical Stability of Organic Materials for OLEDs: A Comparative Study on Sulfonyl, Phosphine-Oxide, and Carbonyl-Containing Host Materials", J. Phys. Chem., 2014, 118, pp. 7569-7578.

*Primary Examiner* — Kiho Kim
(74) *Attorney, Agent, or Firm* — Lewis Roca Rothgerber Christie LLP

(57) ABSTRACT

An apparatus to evaluate a stability of a luminescent material includes an electrochemical cell that includes a sample including a solvent and the luminescent material mixed in the solvent, a voltage application device that applies a constant voltage to the sample, a light source that irradiates a source light to the sample, and a photoluminescence measuring device that measures a luminescence spectrum of an emission light generated by the luminescent material.

16 Claims, 13 Drawing Sheets

(56) References Cited

U.S. PATENT DOCUMENTS

2006/0124888 A1     6/2006   Morrison, Jr. et al.
2016/0329504 A1*   11/2016   Cheng .................... H05B 33/14
2019/0123286 A1*    4/2019   Xia ........................ C09K 11/06

FOREIGN PATENT DOCUMENTS

| JP | 4988444 B2 | 8/2012 |
|----|-----------|--------|
| JP | 5635009 B2 | 12/2014 |
| KR | 10-1101132 B1 | 12/2011 |
| WO | WO 2011/070890 A1 | 6/2011 |

* cited by examiner

US 10,921,253 B2

APPARATUS OF EVALUATING STABILITY OF LUMINESCENT MATERIAL AND METHOD OF EVALUATING THE SAME

CROSS-REFERENCE TO RELATED APPLICATION

Korean Patent Application No. 10-2018-0111165, filed on Sep. 18, 2018, in the Korean Intellectual Property Office, and entitled: "Apparatus of Evaluating Stability of Luminescent Material and Method of Evaluating the Same," is incorporated by reference herein in its entirety.

BACKGROUND

1. Field

Embodiments relate to an apparatus to evaluate a stability of a luminescent material and a method of evaluating the same.

2. Description of the Related Art

A light emitting diode has a structure in which an anode, a light emitting layer, and a cathode are stacked. In the light emitting diode, holes and electrons are injected into the light emitting layer through the anode and the cathode and are recombined in the light emitting layer to generate excitons. The excitons emit energy discharged when an excited state of the excitons returns to a ground state as light. In this case, a light emitting wavelength of green, red, and blue lights is determined according to a material used in the light emitting layer.

SUMMARY

An apparatus to evaluate a stability of a luminescent material includes an electrochemical cell that accommodates a sample including a solvent and the luminescent material mixed in the solvent, a voltage application device that applies a constant voltage to the sample, a light source that irradiates a source light to the sample, and a photoluminescence measuring device that measures a luminescence spectrum of an emission light generated by the luminescent material.

The luminescent material may include a phosphorescent dopant.

The luminescent material may include a thermally activated delayed fluorescent dopant.

The electrochemical cell may include a container accommodating the sample, a reference electrode, a working electrode, and a counter electrode, the reference electrode, the working electrode, and the counter electrode being in the container. The voltage application device may include a potentiostat connected to the reference electrode, the working electrode, and the counter electrode.

The constant voltage may be at a level sufficient to oxidize the luminescent material.

The photoluminescence measuring device may include a spectrometer. The luminescent material may be excitable by the source light to generate the emission light. The spectrometer may measure the luminescent spectrum of the emission light through a path different from a path in which the source light travels.

The photoluminescence measuring device may include a light emitting diode package that excites the luminescent material and a spectrometer that measures the luminescence spectrum of the emission light.

The source light may have a peak wavelength within an absorption wavelength range of the luminescent material.

The emission light may be a blue light. A peak wavelength of the source light may be in a wavelength range from about 400 nm to about 420 nm.

The source light may be to irradiate to the luminescent material at an intensity from about 10 mW/cm2 to about 20 mW/cm2.

Embodiments are also directed to a method evaluating of the stability of a luminescent material. The method may include applying a constant voltage to a sample that includes a solvent and the luminescent material mixed in the solvent, irradiating a source light to the sample in a state in which the constant voltage is applied to the sample, and measuring a luminescence spectrum of an emission light generated by the luminescent material.

The luminescent material may include a phosphorescent dopant.

The luminescent material may include a thermally activated delayed fluorescent dopant.

The luminescent material may be oxidized by the constant voltage.

Measuring the luminescence spectrum of the emission light may be performed in a state in which the constant voltage and the source light are removed from the sample.

The luminescent material may be excited by the source light to generate the emission light. The luminescent spectrum of the emission light may be measured through a path different from a path in which the source light travels.

The emission light may be a blue light. A peak wavelength of the source light may be in a wavelength range from about 400 nm to about 420 nm.

The source light may be irradiated to the luminescent material at an intensity from about 10 mW/cm$^2$ to about 20 mW/cm$^2$.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
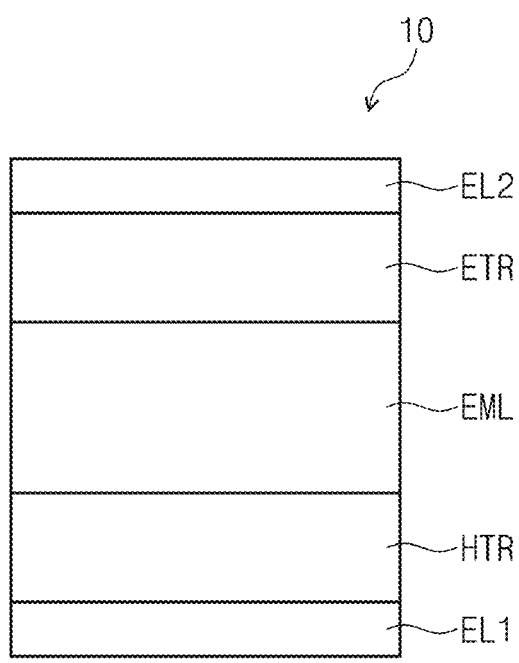
FIG. 1 illustrates a cross-sectional view showing a light emitting diode according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

FIG. 1 illustrates a cross-sectional view schematically showing a light emitting diode 10 according to an exemplary embodiment. The light emitting diode 10 may include a first electrode EL1, a hole transport region HTR, an electron transport region ETR, and a second electrode EL2, which are sequentially stacked one on another.

The hole transport region HTR may include a hole injection layer and a hole transport layer. The electron transport region ETR may include an electron injection layer and an electron transport layer. In some implementations, the hole transport region HTR may include the hole injection layer, the hole transport layer, and an electron block layer, and the electron transport region ETR may include the electron injection layer, the electron transport layer, and a hole block layer.

A light emitting diode included in a light emitting display panel may have substantially the same structure as that of the light emitting diode 10 shown in FIG. 1. A test element group (TEG) device described hereinafter may also have the same structure as that of the light emitting diode 10 shown in FIG. 1.

Each of the first electrode EL1 the hole transport region HTR, the electron transport region ETR, and the second electrode EL2 may include a generally known material and a generally known stacked structure. The light emitting layer EML may include a generally known material.

The light emitting layer EML may have a thickness of about 100 angstroms (Å) to about 1,000 angstroms (Å), or, for example, of about 100 angstroms (Å) to about 300 angstroms (Å). The light emitting layer EML may have a single-layer structure of a single material, a single-layer structure of plural materials different from each other, or a multi-layer structure of plural materials different from each other.

The light emitting layer EML according to an embodiment may include an anthracene derivative, a pyrene derivative, a fluoranthene derivative, a chrysene derivative, a dihydrobenzanthracene derivative, or a triphenylene derivative. For example, the light emitting layer EML may include the anthracene derivative or the pyrene derivative.

The light emitting layer EML may include a host and a dopant as a luminescent material. The host may include the anthracene derivative, the pyrene derivative, the fluoranthene derivative, the chrysene derivative, the dihydrobenzanthracene derivative, or the triphenylene derivative.

The dopant may include a styryl derivative (for example, 1,4-bis[2-(3-N-ethylcarbazoyl)vinyl]benzene (BCzVB), 4-(di-p-tolylamino)-4'-[(di-p-tolylamino)styryl]stilbene (DPAVB), N-(4-((E)-2-(6-((E)-4-(diphenylamino)styryl) naphthalen-2-yl)vinyl)phenyl)-N-phenylbenzenamine (N-BDAVBi)), perylene or a derivative thereof (for example, 2,5,8,11-tetra-t-butylperylene(TBP)), or pyrene or a derivative thereof (for example, 2,5,8,11-tetra-t-butylperylene(TBP), 1,1-dipyrene, 1,4-dipyrenylbenzene, or 1,4-bis(N, N-diphenylamino)pyrene)).

The luminescent material may include a fluorescent material and a phosphorescent material. The fluorescent material may emit light using a singlet exciton. The phosphorescent material may emit light using a triplet exciton. The phosphorescent material may convert the singlet exciton into the triplet exciton through an intersystem crossing (ISC) mechanism to emit the light in the triplet state. The phosphorescent material may include an organometallic compound.

A phosphorescent dopant may include, for example, an iridium (Ir) based compound, a platinum (Pt) based compound, a europium (Eu) based compound, an osmium (Os) based compound, or a terbium (Tb) based compound. The phosphorescent dopant may have the form of a metal complex.

The luminescent material may include a delayed fluorescent material. The delayed fluorescent material may convert the triplet exciton into the singlet exciton and may increase a luminescent efficiency, as compared to only using fluorescence of the singlet exciton. A thermally activated delayed fluorescent material may secure the same efficiency as a phosphorescent material without using a phosphorescent material, such as the organometallic compound. The thermally activated delayed fluorescent material may reduce a difference in energy between a singlet exciton state and a triplet exciton state and theoretically may convert all triplet excitons to singlet excitons through a reversed intersystem crossing (RISC) mechanism. It may be possible to generate about 100% of singlet excitons. As another delayed fluorescent material, a triplet-triplet annihilation (TTA) material or a triplet fusion material may be used. In these materials, singlet excitons may be generated through a collision of two triplet excitons. Theoretically, it may be possible to generate about 62.5% of singlet excitons.

A thermally activated delayed fluorescent dopant may be a D-A (donor-acceptor) type polycyclic compound or a condensed ring compound in which an aromatic ring is condensed. The D-A (donor-acceptor) type polycyclic compound may include a donor and an acceptor. As the donor, an amino group, a carbazole derivative, or an acridine derivative may be used. As the acceptor, a 5- or 6-membered monocyclic ring or polycyclic ring containing at least one nitrogen atom may be used. The condensed ring compound may be a condensed aromatic compound including at least one hetero atom. The condensed ring compound may be a condensed polycyclic aromatic compound and may include a hetero atom, such as B, N, or O.

The thermally activated delayed fluorescent dopant may include, for example, 9,9'-(sulfonylbis(4,1-phenylene))bis (3,6-di-tert-butyl-9H-carbazole), 10,10'-((4-phenyl-4H-1,2, 4-triazole-3,5-diyl)bis(4,1-phenylene))bis(10H-phenoxazine), bis(4-(9H-[3,9'-bicarbazole]-9-yl)phenyl) methanone, 10,10'-(sulfonylbis(4,1-phenylene))bis(9,9-dimethyl-9,10-dihydroacridine), 9'-(4-(4,6-diphenyl-1,3,5-triazin-2-yl)phenyl)-3,3'',6,6''-tetraphenyl-9'H-9,3':6',9''-tercarbazole, 9'-(4-(4,6-diphenyl-1,3,5-triazin-2-yl)phenyl)-9'H-9,3':6',9''-tercarbazole, 9,9'-(5-(4,6-diphenyl-1,3,5-triazin-2-yl)-1,3-phenylene)bis(9H-carbazole), 9,9',9'',9'''-((6-phenyl-1,3,5-triazine-2,4-diyl)bis(benzene-5,3,1-triyl)) tetrakis(9H-carbazole), 9,9'-(sulfonylbis(4,1-phenylene))bis (3,6-dimethoxy-9H-carbazole), 9-(4-(4,6-diphenyl-1,3,5-triazin-2-yl)phenyl)-9H-carbazole, 5,9-diphenyl-5,9-dihydro-5,9-diaza-13b-boranaphtho[3,2,1-de]anthracene, 10-(4-(4,6-diphenyl-1,3,5-triazin-2-yl)phenyl)-9,9-dimethyl-9,10-dihydroacridine, 2,6-di(9H-carbazol-9-yl)-4-phenylpyridine-3,5-dicarbonitrile, the styryl derivative (for example, 1,4-bis[2-(3-N-ethylcarbazoyl)vinyl]benzene (BCzVB), 4-(di-p-tolylamino)-4'-[(di-p-tolylamino)styryl] stilbene (DPAVB), N-(4-((E)-2-(6-((E)-4-(diphenylamino) styryl) naphthalen-2-yl)vinyl)phenyl)-N-phenylbenzenamine (N-BDAVBi)), perylene or a derivative thereof (for example, 2,5,8,11-tetra-t-butylperylene(TBP)), or pyrene or a derivative thereof (for example, 2,5,8,11-tetra-t-butylperylene(TBP), such as 1,1-dipyrene, 1,4-dipyrenylbenzene, 1,4-bis(N, N-diphenylamino)pyrene).

Before applying the luminescent material to the light emitting display panel, a stability of the luminescent material may be evaluated. The stability of the luminescent material may be used to determine a life time of the light emitting diode. The reliability of a stability evaluation may be improved when the stability evaluation of the luminescent material is performed in an environment similar to that of the light emitting diode applied to a light emitting display panel.

The light emitting diode of a light emitting display panel may be placed not only in an excited state but also in a polaron state. The luminescent material of a light emitting diode may be subjected to stress under these conditions, and stress-tolerance properties may determine the lifetime of the light emitting diode.

A degradation mechanism of a luminescent material has been reported as an exciton-polaron quenching effect accompanied by the polaron state, a mechanism that may be more influential than an exciton-exciton annihilation. The evaluation apparatus and method of the luminescent material described below may provide an environment in which the exciton-polaron quenching effect occurs with the luminescent material.

Figure 2:
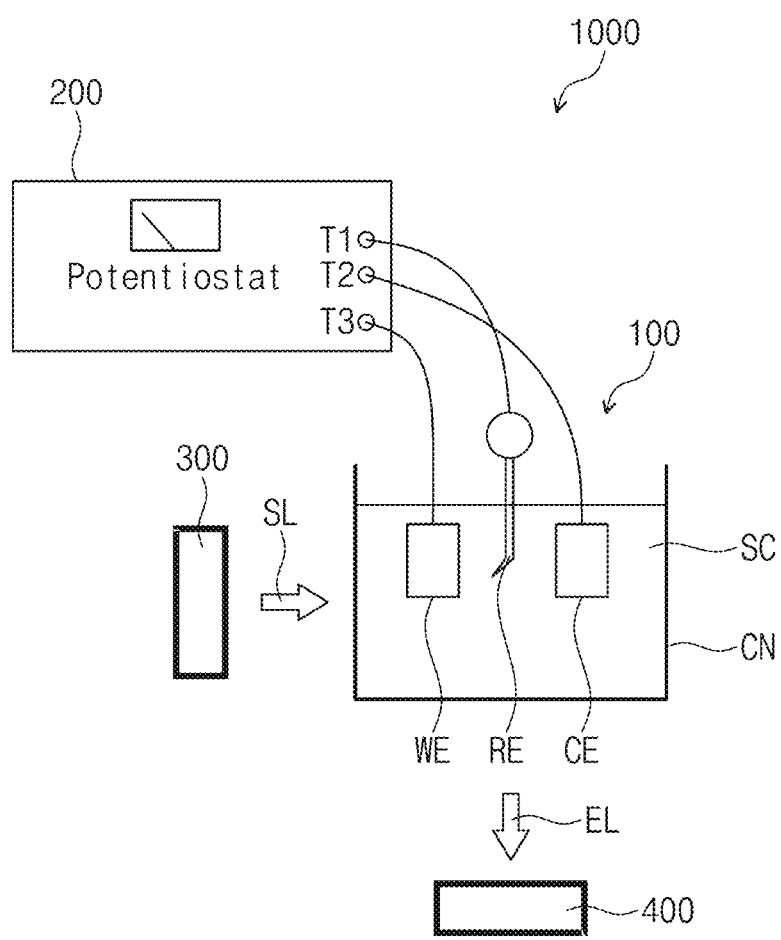
FIG. 2 illustrates a schematic view showing an apparatus of evaluating a stability of a luminescent material according to an exemplary embodiment of the present disclosure.
Figure 3A:
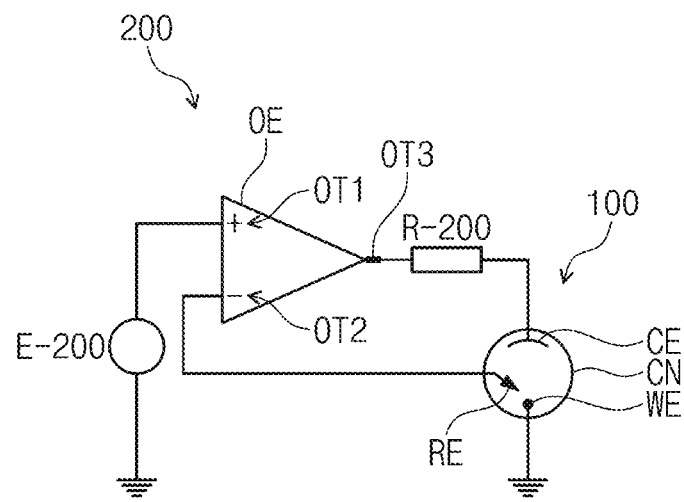
FIGS. 3A and 3B illustrate equivalent circuit diagrams showing a potentiostat according to an exemplary embodiment of the present disclosure.
Figure 3B:
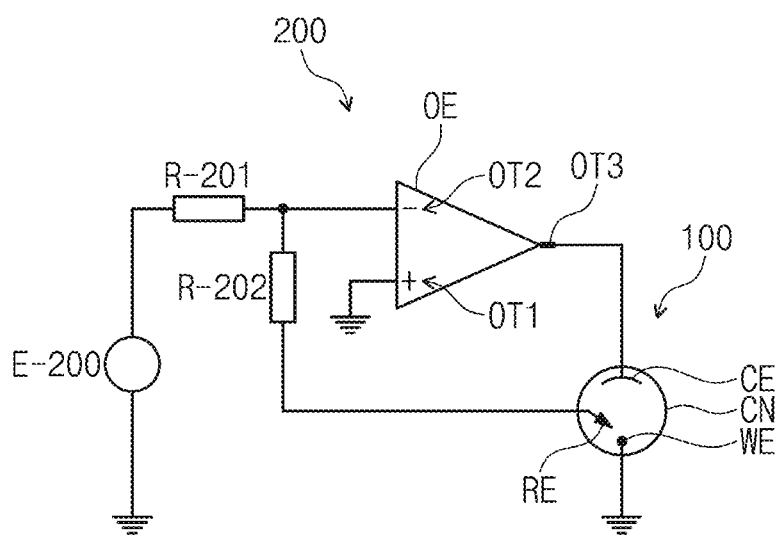

FIG. 2 illustrates a schematic view showing an apparatus 1000 for evaluating the stability of a luminescent material according to an exemplary embodiment. FIGS. 3A and 3B are equivalent circuit diagrams showing a potentiostat according to an exemplary embodiment.

Referring to FIG. 2, the apparatus 1000 for evaluating the stability of the luminescent material may include an electrochemical cell 100, a voltage application device 200, a light source 300, and a photoluminescence measuring device 400.

The electrochemical cell 100 may store a sample SC including a solvent and the luminescent material to be evaluated mixed in the solvent. The solvent may be an organic solvent, such as MeOH, acetonitrile (An), tetrahydrofuran (THF), n-methylpyrrolidone (NMP), dimethylsulfoxide (DMSO), or dimethylformamide (DMF). The solvent may be a mixture of two or more solvents.

The luminescent material may be one of the luminescent materials described with reference to FIG. 1 or a new material to be evaluated. For example, the luminescent material may include one of a phosphorescent dopant, a phosphorescent host, a thermally activated delayed fluorescent dopant, and a thermally activated delayed fluorescent host.

The electrochemical cell 100 may include a container CN that stores the sample SC, a reference electrode RE, a working electrode WE, and a counter electrode CE. The reference electrode RE, the working electrode WE, and the counter electrode CE may be in the container CN. The reference electrode RE, the working electrode WE, and the counter electrode CE may be immersed in the sample SC.

The container CN may be a transparent container, such as a glass or plastic container. The reference electrode RE may have a constant electric potential. The reference electrode RE may measure the electric potential generated in the counter electrode CE. The reference electrode RE may include, for example, a silver-silver chloride electrode, a calomel electrode, a mercury-mercury sulfate electrode, or a mercury-mercuric oxide electrode.

A current may flow between the counter electrode CE and the working electrode WE. The counter electrode CE may be a platinum or graphene electrode and may have a form of, for example, a wire, net, plate, or filament. The working electrode WE may be a platinum, gold, or carbon electrode.

The voltage application device 200 may apply a constant voltage to the sample SC. The luminescent material may be in a polaron state due to the constant voltage. The voltage application device 200 may be, for example, a potentiostat. As shown in FIG. 2, the voltage application device 200 may include first, second, and third terminals T1, T2, and T3 respectively connected to the reference electrode RE, the counter electrode CE, and the working electrode WE. The first, second, and third terminals T1, T2, and T3 may be connected to the reference electrode the counter electrode CE, and the working electrode WE through wirings.

The light source 300 may irradiate a source light SL to the sample SC. The light source 300 may include one of an ultraviolet laser, a light emitting diode package, a xenon arc lamp, a mercury arc lamp, and a xenon mercury arc lamp.

The source light SL may have a peak wavelength within an absorption wavelength range of the luminescent material. Herein, the term "peak wavelength" refers to a wavelength of peak intensity. The luminescent material may absorb the source light and may be placed in an excited state. A source light having a peak wavelength in a wavelength range from about 400 nm to about 420 nm may be irradiated to a blue luminescent material to generate a blue light having a wavelength from about 410 nm to about 480 nm. A source light having a peak wavelength in a wavelength range from about 460 nm to about 480 nm may be irradiated to a green luminescent material to generate a green light having a wavelength from about 500 nm to about 570 nm, A source light having a peak wavelength in a wavelength range from about 520 nm to about 540 nm may be irradiated to a red luminescent material to generate a red light having a wavelength from about 580 nm to about 670 nm. The peak wavelength of the source light may be differently determined depending on the luminescent material.

The photoluminescence measuring device 400 may measure an emission light EL generated by the luminescent material. The photoluminescence measuring device 400 may measure a luminescence spectrum of the emission light EL.

In an exemplary embodiment, the photoluminescence measuring device 400 may include a spectrometer. The spectrometer may measure the luminescence spectrum of the emission light EL generated in real time when the luminescent material is excited by the source light SL.

The spectrometer may measure the emission light EL through a path that is different from a traveling path of the source light SL. As shown in FIG. 2, when the traveling path of the source light SL is in a horizontal direction, a measuring path of the emission light EL may be, for example, in a vertical direction. The voltage application device 200, the light source 300, and the photoluminescence measuring device 400 may be connected to a computer system. Each of the voltage application device 200, the light source 300, and the photoluminescence measuring device 400 may be controlled by the computer system.

In an exemplary embodiment, the photoluminescence measuring device 400 may include a light emitting diode package that excites the luminescent material and a spectrometer that measures the luminescence spectrum of the emission light. In some implementations, the spectrometer may measure the luminescence spectrum of the emission light EL in a state in which the constant voltage and the source light SL are removed from the sample SC, without measuring the luminescence spectrum of the emission light EL in real time.

The photoluminescence measuring device 400 may irradiate light to a sample that is degraded using the light emitting diode package. The luminescent material excited by the light emitting diode package may generate the emission light, and the spectrometer may measure the emission light. The luminescence spectrum of the luminescent material may be measured without using a separate computer system.

Referring to FIGS. 3A and 3B, the potentiostat may include an operational amplifier hereinafter, referred to as "op-amp") OE, a voltage supply circuit E-200, and internal resistors R-200, R-201, and R-202 in an equivalent circuit. The voltage supply circuit E-200 may supply an input voltage selected from a predetermined range to the op-amp OE. The potentiostat may maintain a voltage in proportion to the input voltage. A current path may be formed between the counter electrode CE and the working electrode WE. A current in proportion to the input voltage may flow through the current path. A feedback current may flow from the reference electrode RE to the op-amp OE.

As shown in FIG. 3A, the voltage supply circuit E-200 may be connected to a non-inverting input terminal OT1. The internal resistor R-200 may be defined between an output terminal OT3 of the op-amp OE and the counter electrode CE. The reference electrode RE may be connected to an inverting input terminal OT2.

As shown in FIG. 3B, the voltage supply circuit E-200 may be connected to the inverting input terminal OT2. The internal resistors R-201 and R-202 may be defined between the voltage supply circuit E-200 and the inverting input terminal OT2 and between the reference electrode RE and the inverting input terminal OT2, respectively. The reference electrode RE may be connected to the inverting input terminal OT2. The non-inverting input terminal OT1 may be grounded.

Hereinafter, the evaluation method of the stability of the luminescent material will be described with reference to FIG. 2.

A constant voltage may be applied to the sample SC. The constant voltage may have a level that is determined depending on the type of the luminescent material included in the sample SC. The constant voltage may have a level sufficient to oxidize or reduce the luminescent material. Oxidation/reduction voltage levels with respect to the luminescent material may be obtained through differential pulsed voltammetry (DPV).

According to the present exemplary embodiment, the level of the constant voltage may be controlled such that the luminescent material is oxidized and placed in a positive (+) polaron state. This state may provide an environment similar to that of a light emitting diode in which a hole trap occurs when emitting light.

The source light SL may be irradiated onto the sample SC in a state where a constant voltage is applied to the sample SC. The peak wavelength of the source light SL may be determined depending on the absorption wavelength of the luminescent material. The source light SL may be irradiated at an intensity of about 10 mW/cm$^2$ to 20 mW/cm$^2$. When the light source 300 provides the source light SL with this intensity, the luminescent material may be placed in the excited state.

The luminescence spectrum of the emission light EL emitted from the luminescent material may be measured. For example, the luminescence spectrum of the emission light EL may be measured in real time in a state where a constant voltage and the source light are applied. In some implementations, the luminescence spectrum of the emission light EL may be measured intermittently using another light source in a state where the constant voltage and the source light are removed.

A time during which the constant voltage and the source light are applied may be used to determine a degradation time of the luminescent material. The luminescent material that is degraded during the predetermined time may be excited by the light emitting diode package, and the emission light emitted from the luminescent material may be measured, to thereby determine a degradation degree of the luminescent material.

The luminescent material may be determined to be degraded in the excited state and the polaron state by the constant voltage and the source light applied thereto. These degradation environments are similar to the degradation environment of a light emitting diode operated in a display panel. Accordingly, the stability of the luminescent material may be evaluated by analyzing a variation in luminescence intensity with time. The evaluation result obtained as described above may be very similar to the evaluation result obtained using a TEG device. The evaluation result will be described in more detail with reference to FIGS. 4A and 4B, 5A to 5F, 6A and 6B, 7A and 7B, 8A to 8E, and 9A and 9B.

Figure 4A:
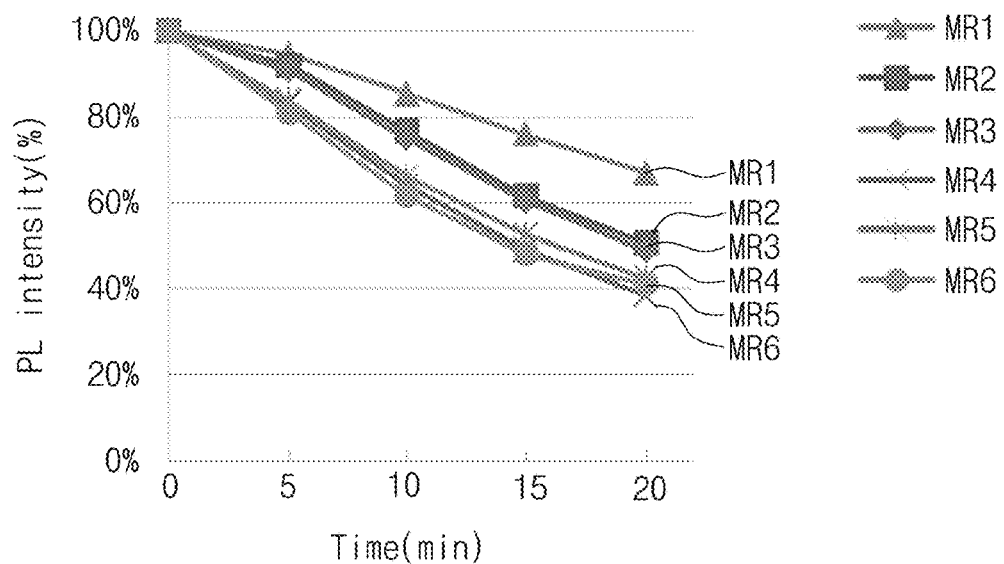
FIG. 4A illustrates a graph obtained by measuring a variation in luminescence intensity using a method of evaluating the stability of the luminescent material according to a comparison embodiment.
Figure 4B:
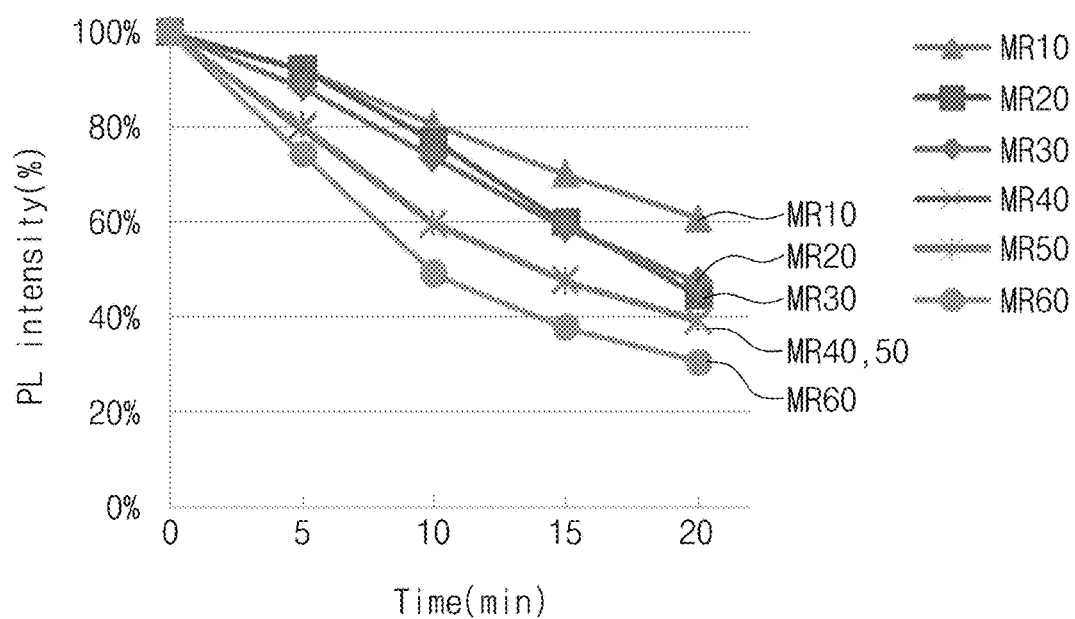
FIG. 4B illustrates a graph obtained by measuring a variation in luminescence intensity using a method of evaluating the stability of the luminescent material according to an exemplary embodiment of the present disclosure.
Figure 5A:
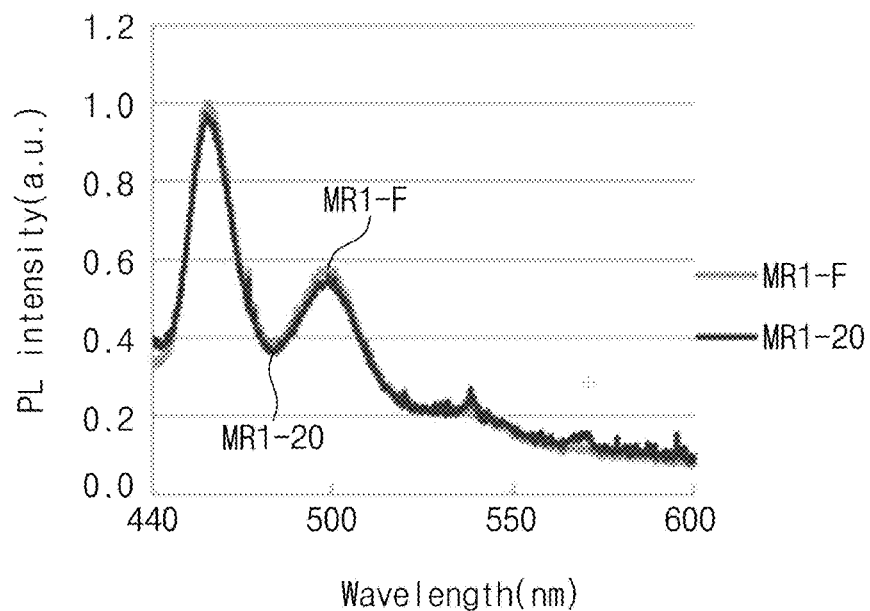
FIGS. 5A to 5F illustrate graphs showing variations in a luminescence spectrum of a TEG device.
Figure 5B:
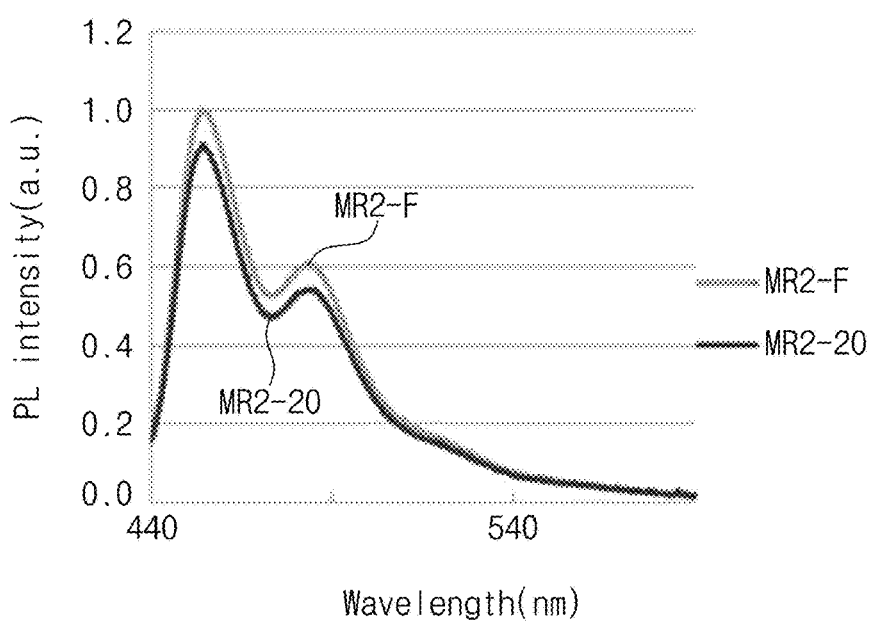
Figure 5C:
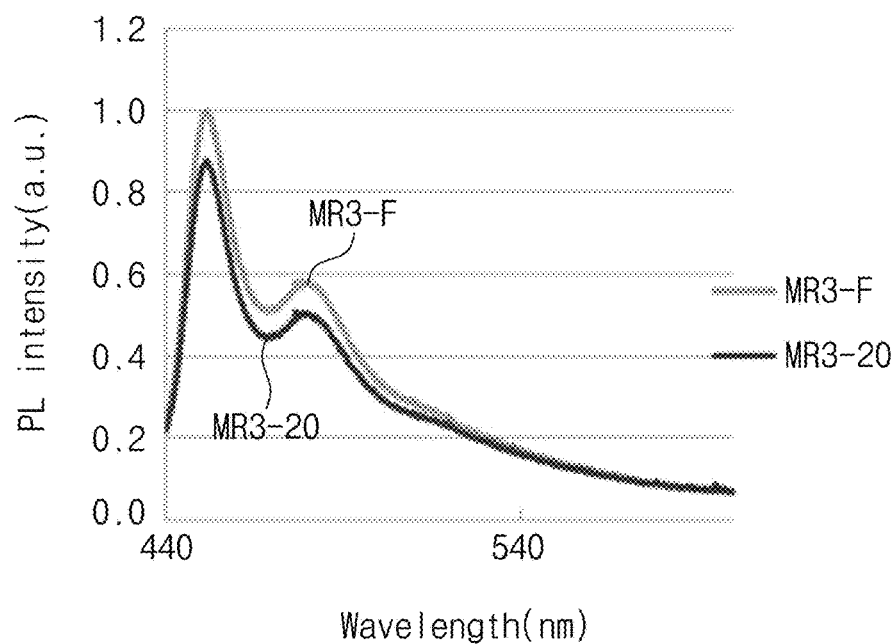
Figure 5D:
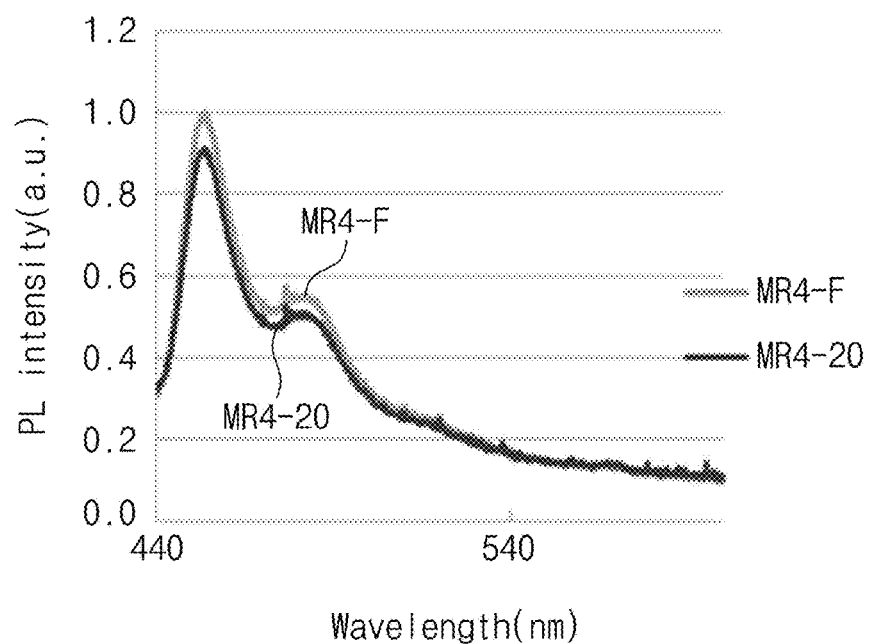
Figure 5E:
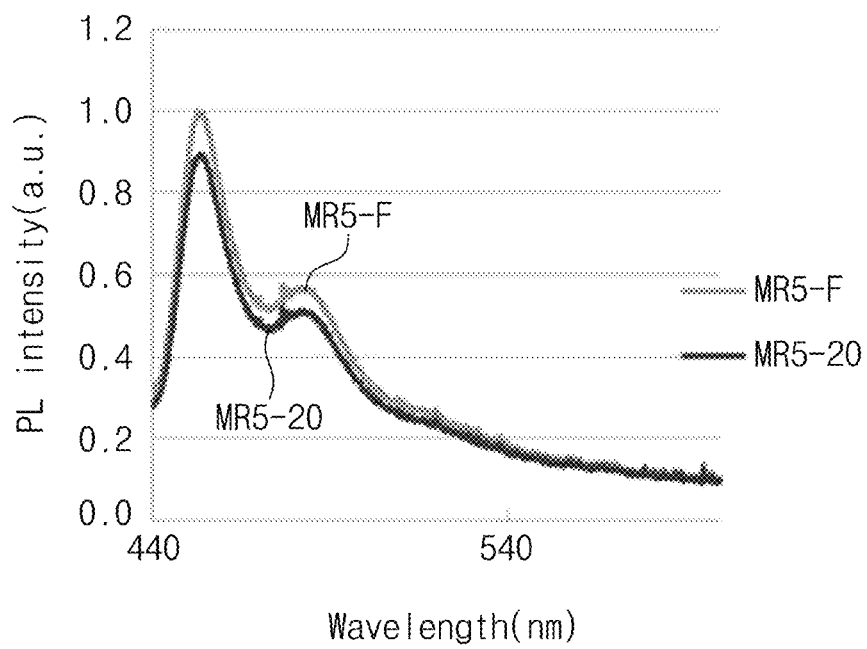
Figure 5F:
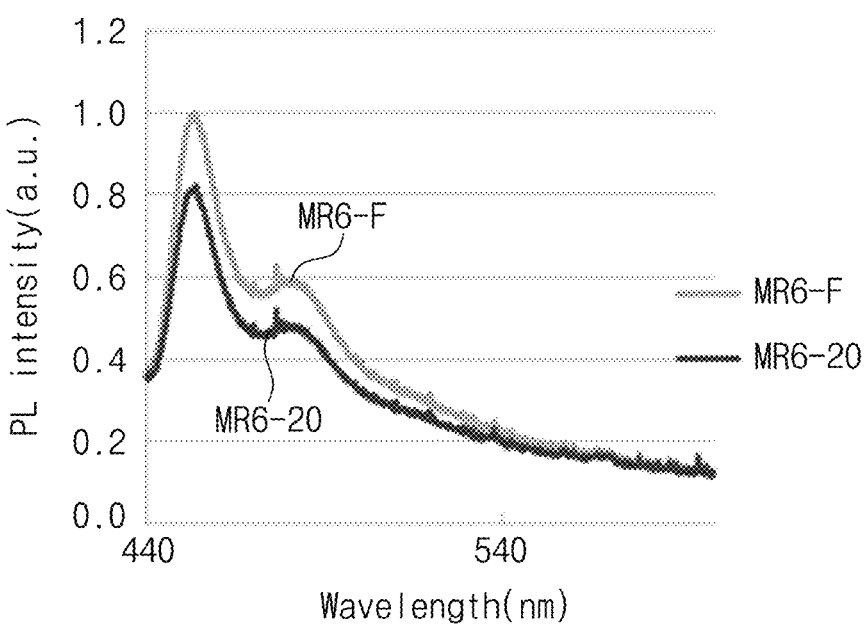

FIG. 4A illustrates a graph obtained by measuring a variation in luminescence intensity using a method of evaluating the stability of the luminescent material according to a comparison embodiment. FIG. 4B is a graph obtained by measuring a variation in luminescence intensity using the method of evaluating the stability of the luminescent material according to an exemplary embodiment of the present disclosure. FIGS. 5A to 5F are graphs showing a variation in the luminescence spectrum of a TEG device.

Referring to FIGS. 4A and 4B, the stability evaluation was performed on first to sixth phosphorescent dopants. FIG. 4A shows the stability evaluation result according to the comparison embodiment, and FIG. 4B shows the stability evaluation result according to the exemplary embodiment of the present disclosure, which is described with reference to FIG. 2.

First to sixth graphs MR1 to MR6 shown in FIG. 4A indicate the intensity of the emission light as a function of degradation time. The intensity was measured after irradiating the source light to first to sixth samples to form the degradation environment. First to sixth graphs MR10 to MR60 shown in FIG. 4B indicate the intensity of the emission light as a function of the degradation time. The intensity was measured with respect to the same samples as the first to sixth samples used in an experiment of FIG. 4A. The degradation environment was prepared by irradiating a source light to the samples in the state where a constant voltage was applied to the samples. The source light in FIGS. 4A and 4B had a peak wavelength of about 405 nm and was irradiated at an intensity of about 15 mW/cm². The first to sixth samples included blue phosphorescent dopants that were different from each other.

FIGS. 5A to 5F illustrate graphs showing the variations in the luminescence spectrum of the TEG devices including first to sixth phosphorescent dopants. TEG devices including the same phosphorescent dopants as the first to sixth blue phosphorescent dopants used in the experiment of FIGS. 4A and 4B were manufactured.

FIGS. 5A to 5F illustrate an initial luminescence spectrum of the TEG devices and the luminescence spectrum of the TEG devices after the TEG devices were driven for about 20 hours. The phosphorescent dopants of the TEG devices were degraded by driving the TEG devices for about 20 hours at about 1000 nit. The source light was irradiated to the TEG devices to excite the phosphorescent dopants included in the TEG devices, and the luminescence spectra were measured. In the present exemplary embodiment, the source light had a peak wavelength of about 405 nm and was irradiated at an intensity of about 15 mW/cm².

In FIGS. 5A to 5F, the initial luminescence spectrum is represented by first graphs MR1-F to MR6-F, and the luminescence spectrum after about 20 hours of driving is represented by second graphs MR1-20 to MR6-20. As can be seen from the second graphs MR1-20 to MR6-20, the luminescence intensity of each phosphorescent dopant was lowered compared with the luminescence intensity shown in first graphs MR1-F to MR6-F due to the degradation of the TEG devices.

Figure 6A:
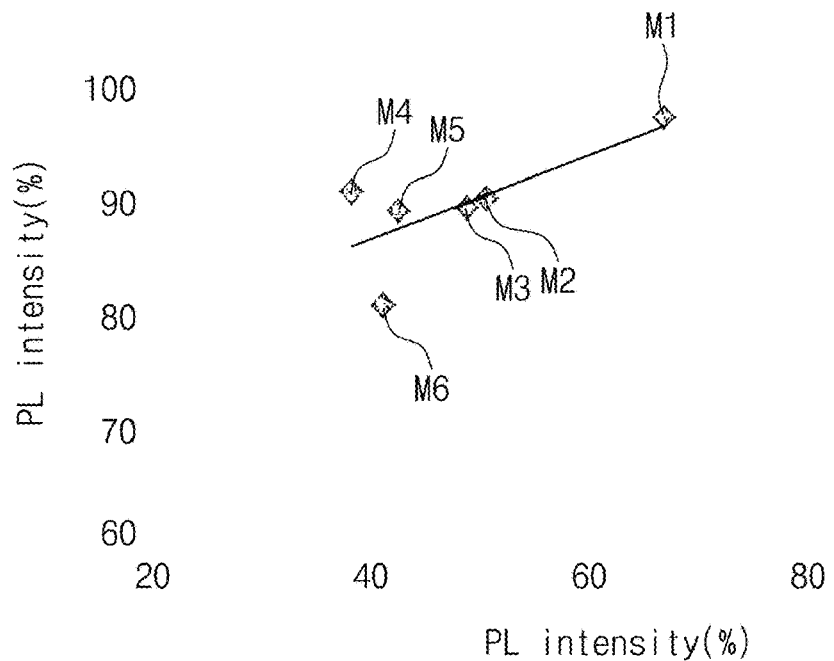
FIG. 6A illustrates a graph showing an agreement rate between an evaluation result of the stability of the luminescent material in the comparison embodiment and an evaluation result of the stability of the luminescent material that is obtained by using a TEG device.
Figure 6B:
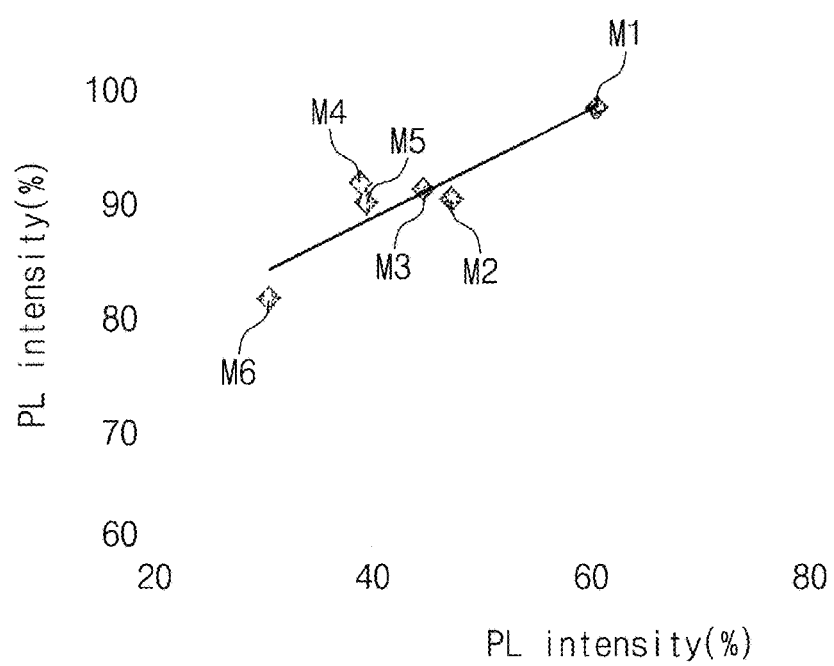
FIG. 6B illustrates a graph showing an agreement rate between an evaluation result of the stability of the luminescent material according to an exemplary embodiment of the present disclosure and the evaluation result of the stability of the luminescent material that is obtained by using the TEG device.

FIG. 6A illustrates a graph showing an agreement rate between the evaluation result of the stability of the luminescent material in the comparison embodiment and the evaluation result of the stability of the luminescent material that is obtained by using a TEG device. FIG. 6B illustrates a graph showing an agreement rate between the evaluation result of the stability of the luminescent material according to an exemplary embodiment of the present disclosure and the evaluation result of the stability of the luminescent material that was obtained by using the TEG device.

In FIGS. 6A and 6B, the Y-axis shows the luminescence intensity of six TEG devices after about 20 hours of driving, and the X-axis shows the luminescence intensity according to the stability evaluation of the luminescent material in the comparison embodiment and the exemplary embodiment of the present disclosure. Values on the X-axis in FIGS. 6A and 6B were measured at a time point of 20 minutes as shown in FIGS. 4A and 4B.

In FIGS. 6A and 6B, first to sixth dots M1 to M6 correspond to the first to sixth phosphorescent dopants described with reference to FIGS. 4A and 4B and 5A to 5F in a one-to-one fashion.

Referring to FIG. 6A, the variation of the first to sixth dots M1 to M6 was shown to be non-linear. A linearity of the first to sixth dots M1 to M6 was about 53%. Referring to FIG. 6B, the variation of the first to sixth dots M1 to M6 was relatively linear compared with that of FIG. 6A. The linearity of the first to sixth dots M1 to M6 was about 82%.

In FIGS. 6A and 6B, the fact that the linearity of the first to sixth dots M1 to M6 is low indicates that the agreement rate of the stability evaluation result of the luminescent material according to the comparison embodiment or according to the embodiment of the present disclosure with the stability evaluation result of the luminescent material using the TEG device is low. Referring to FIGS. 6A and 6B, the stability evaluation of the luminescent material according to the present exemplary embodiment may obtain a highly reliable result without manufacturing the TEG device.

Figure 7A:
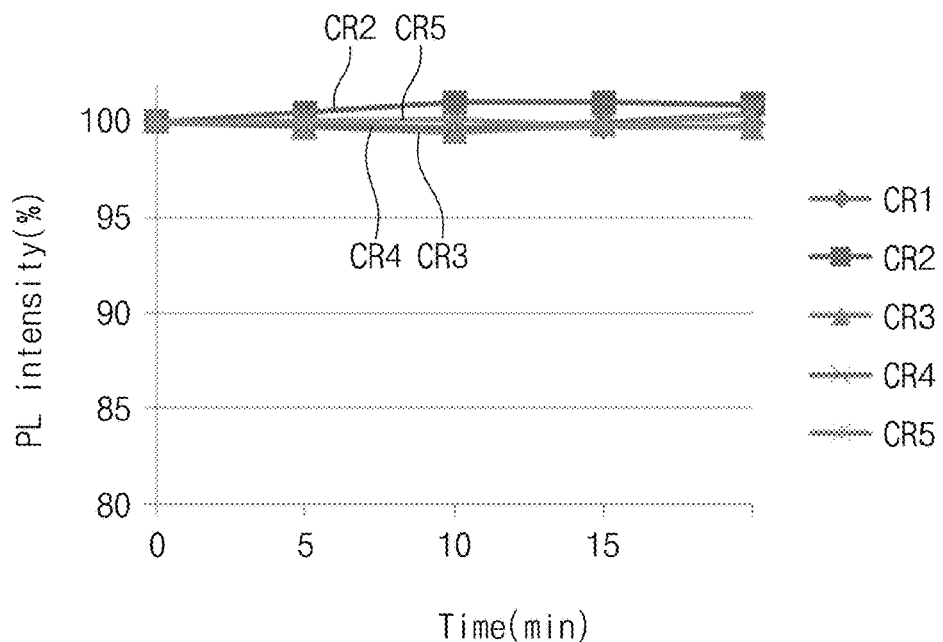
FIG. 7A illustrates a graph obtained by measuring a variation in luminescence intensity using a method of evaluating the stability of the luminescent material according to a comparison embodiment.
Figure 7B:
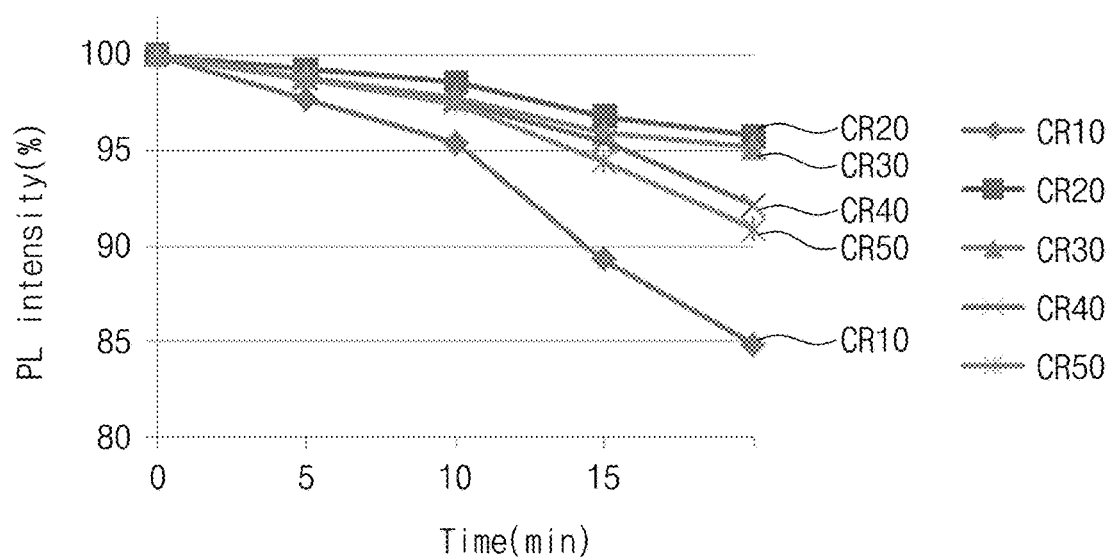
FIG. 7B illustrates a graph obtained by measuring a variation in luminescence intensity using a method of evaluating the stability of the luminescent material according to an exemplary embodiment of the present disclosure.

FIG. 7A illustrates a graph obtained by measuring a variation in luminescence intensity using a method of evaluating the stability of the luminescent material according to a comparison embodiment. FIG. 7B illustrates a graph obtained by measuring a variation in luminescence intensity using a method of evaluating the stability of the luminescent material according to an exemplary embodiment of the present disclosure. FIGS. 8A to 8E illustrates graphs showing a variation in luminescence spectrum of a TEG device.

First to fifth graph lines CR1 to CR5 shown in FIG. 7A indicate the intensity of the emission light with respect to the degradation time, as measured after irradiating the source light to first to fifth samples to form the degradation environment. First to fifth graph lines CR10 to CR50 shown in FIG. 7B indicate the intensity of the emission light with respect to the degradation time, as measured from the same samples as the first to fifth samples used in an experiment of FIG. 7A. The degradation environment was prepared by irradiating the source light to the samples in the state where the constant voltage was applied to the samples. The source light in FIGS. 7A and 7B had a peak wavelength of about 405 nm and was irradiated at an intensity of about 20 mW/cm². The first to fifth samples included thermally activated delayed fluorescent dopants that were different from each other.

FIGS. 8A to 8E illustrate graphs showing variations in the luminescence spectrum of the TEG devices including first to fifth thermally activated delayed fluorescent dopants. The TEG devices included the same dopants as the first to fifth thermally activated delayed fluorescent dopants used in the experiment of FIGS. 7A and 7B.

FIGS. 8A to 8E show an initial luminescence spectrum of the TEG devices and the luminescence spectrum of the TEG devices after the TEG devices have been driven for about 20 hours. The thermally activated delayed fluorescent dopants of the TEG devices were degraded by driving the TEG devices for about 20 hours at about 1000 nit. The source light was irradiated to the TEG devices to excite the thermally activated delayed fluorescent dopants, and the luminescence spectrums were measured. In the present exemplary embodiment, the source light had a peak wavelength of about 405 nm and was irradiated at an intensity of about 20 mW/cm$^2$. In FIGS. 8A to 8E, a range represented by a dotted-line circle indicates a wavelength range emitted by the thermally activated delayed fluorescent dopants.

Figure 8A:
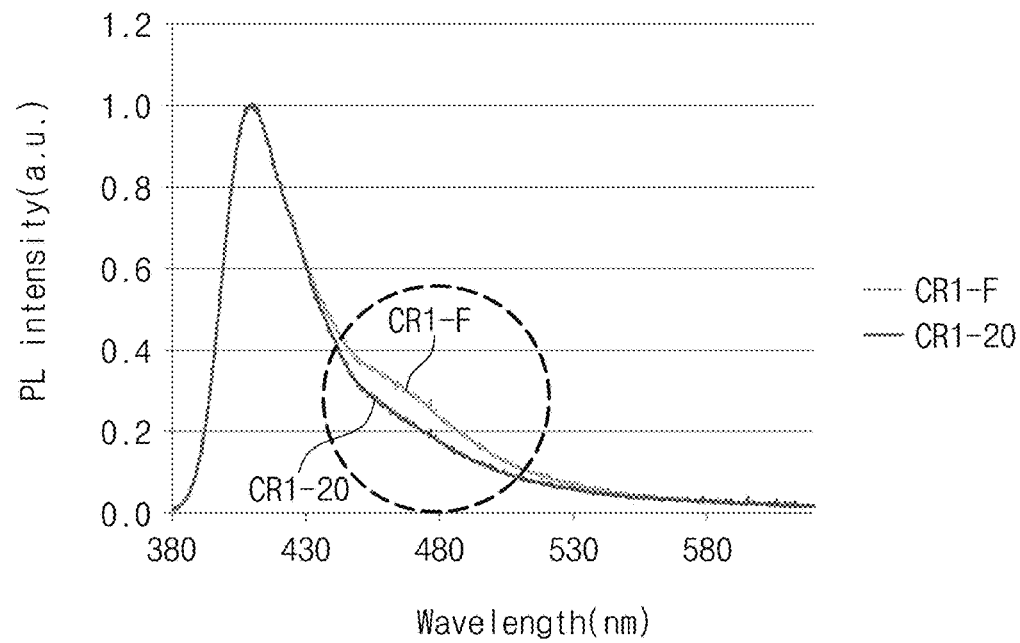
FIGS. 8A to 8E illustrate graphs showing a variation in luminescence spectrum of a TEG device.
Figure 8B:
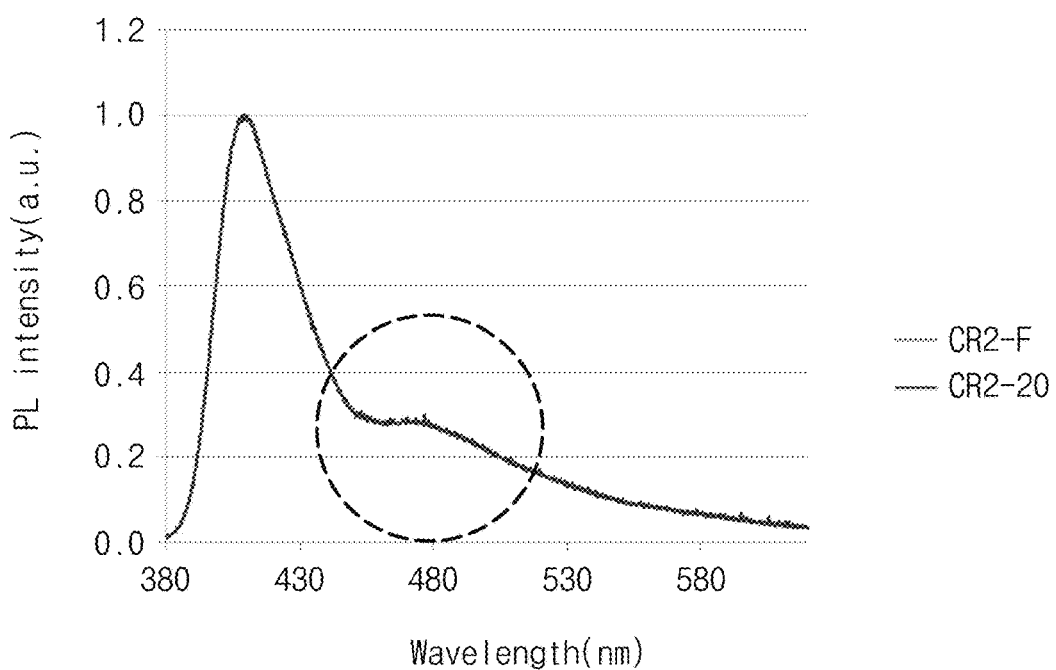
Figure 8C:
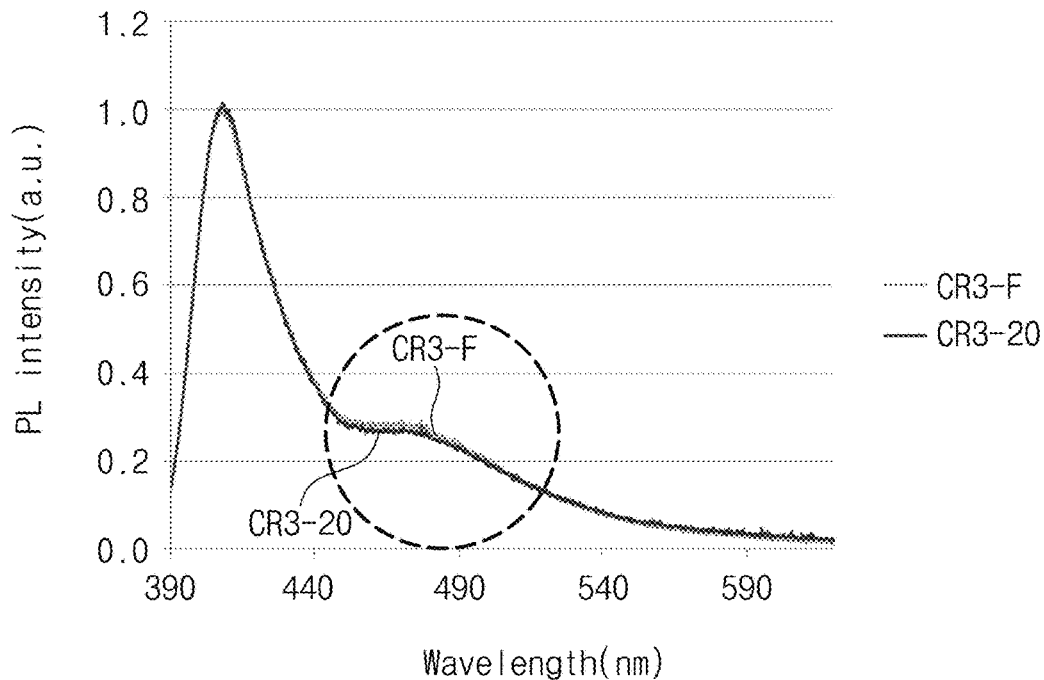
Figure 8D:
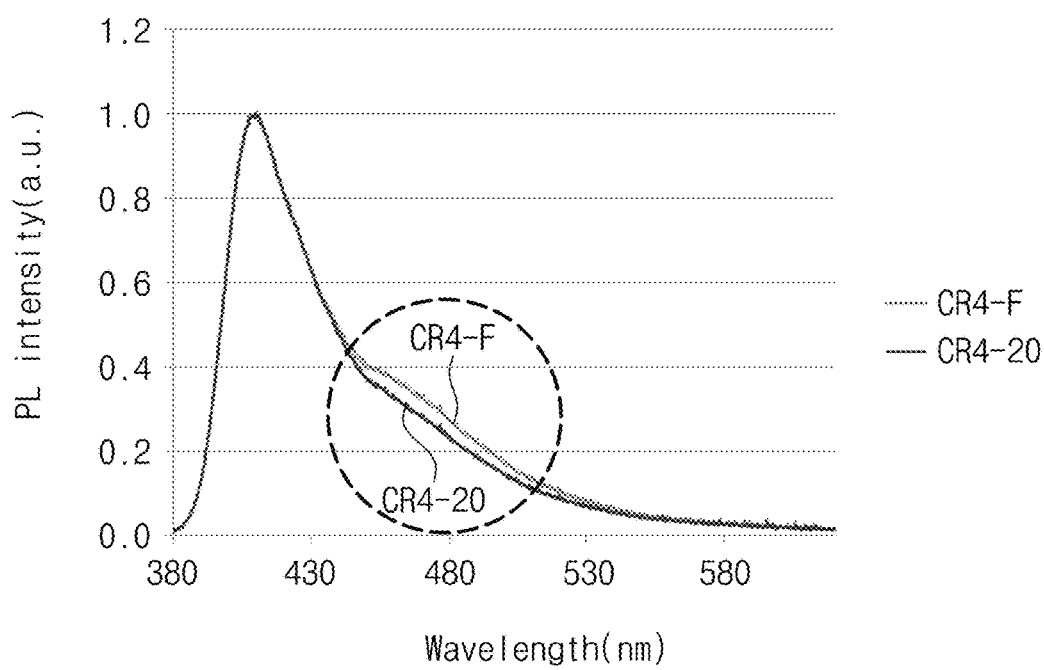
Figure 8E:
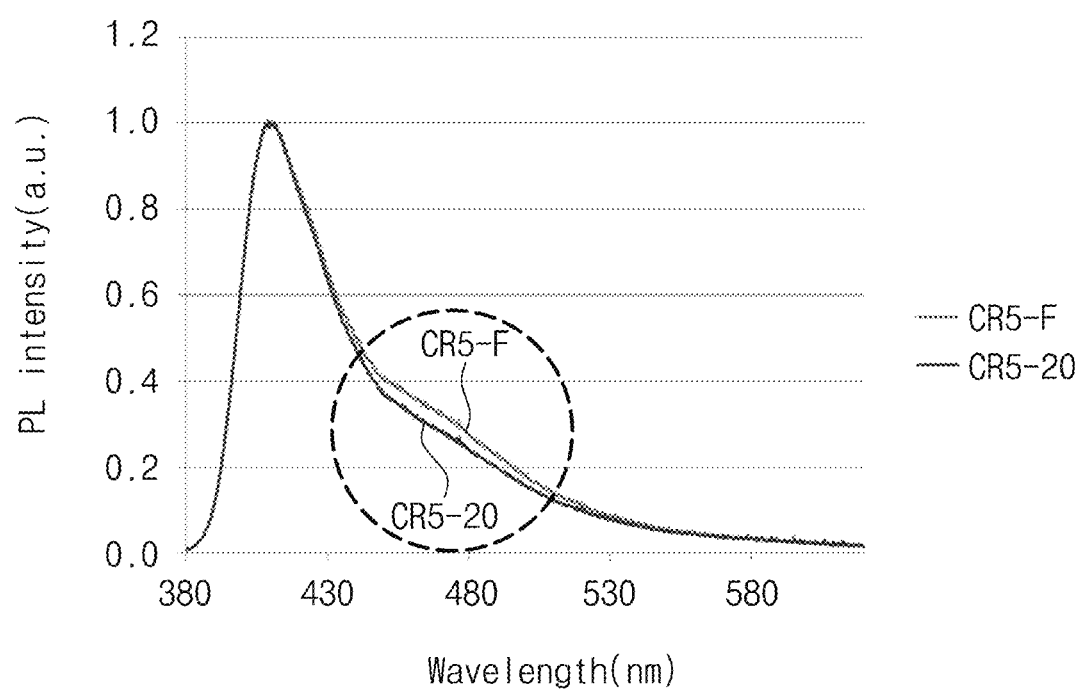

In FIGS. 8A to 8E, the initial luminescence spectrum was represented by first graph lines CR1-F to CR5-F, and the luminescence spectrum after about 20 hours of driving was represented by second graph lines CR1-20 to CR5-20. As represented by the second graph lines CR1-20 to CR5-20, the luminescence intensity was lower compared with the luminescence intensity as represented by the first graph lines CR1-F to CR5-F. In FIG. 8B, the first graph line CR2-F and the second graph line CR2-20 were substantially the same as each other and are shown as a single graph line.

Figure 9A:
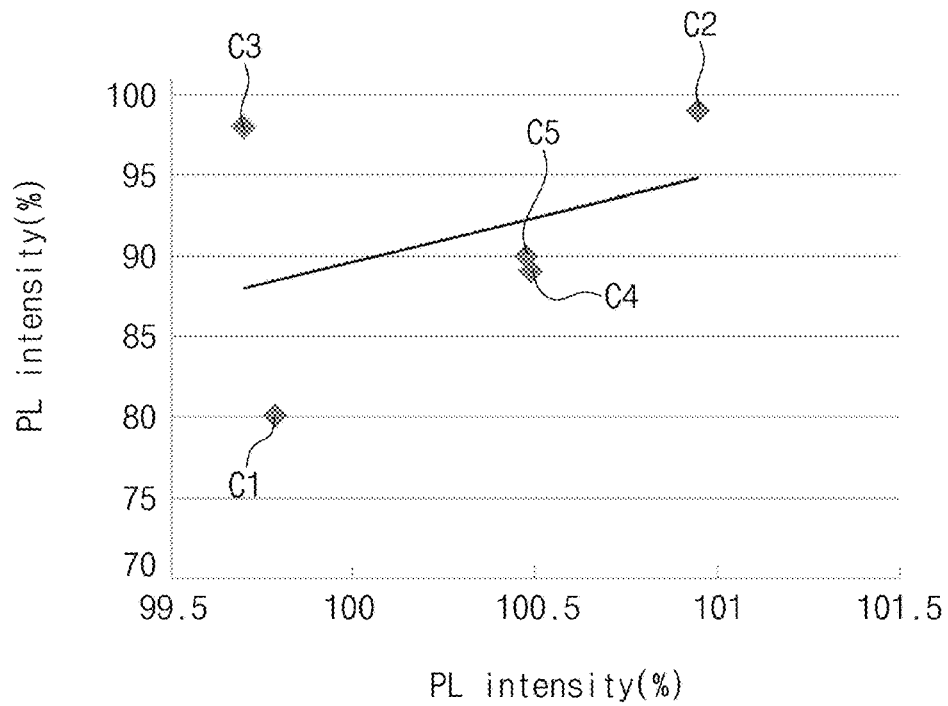
FIG. 9A illustrates a graph showing an agreement rate between an evaluation result of the stability of the luminescent material in the comparison embodiment and an evaluation result of the stability of the luminescent material that is obtained by using a TEG device.
Figure 9B:
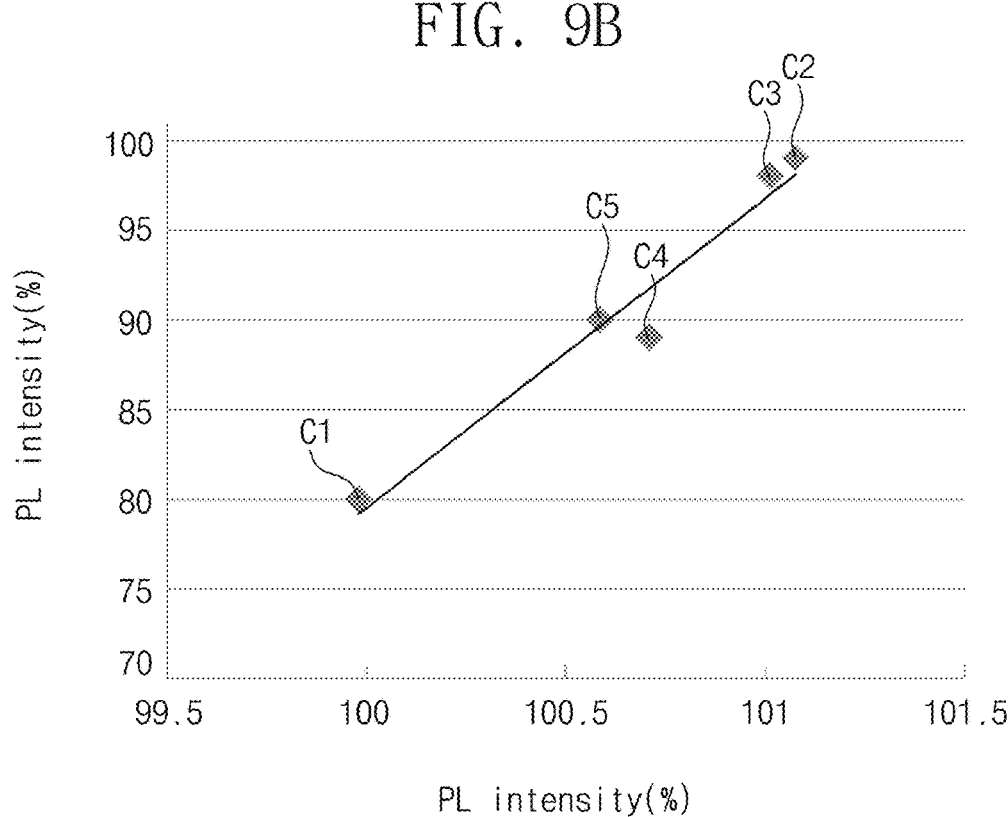
FIG. 9B illustrates a graph showing an agreement rate between an evaluation result of the stability of the luminescent material according to an exemplary embodiment of the present disclosure and the evaluation result of the stability of the luminescent material that is obtained by using the TEG device.

FIG. 9A illustrates a graph showing an agreement rate between an evaluation result of the stability of the luminescent material in the comparison embodiment and an evaluation result of the stability of the luminescent material that is obtained by using a TEG device. FIG. 9B illustrates a graph showing an agreement rate between an evaluation result of the stability of the luminescent material according to an exemplary embodiment of the present disclosure and the evaluation result of the stability of the luminescent material that is obtained by using the TEG device.

In FIGS. 9A and 9B, the Y-axis represents the luminescence intensity of five TEG devices after about 20 hours of driving, and the X-axis represents the luminescence intensity obtained according to the stability evaluation of the luminescent material of the comparison embodiment and the exemplary embodiment of the present disclosure. Values along the X-axis in FIGS. 9A and 9B were measured at a time point of 20 minutes of FIGS. 7A and 7B.

In FIGS. 9A and 9B, the first to fifth dots C1 to C5 correspond to the first to fifth thermally activated delayed fluorescent dopants described with reference to FIGS. 7A and 7B and 8A to 8E in a one-to-one fashion.

Referring to FIG. 9A, the variation of the first to fifth dots C1 to C5 was non-linear. A linearity of the first to fifth dots C1 to C5 was about 14%. Referring to FIG. 9B, the variation of the first to fifth dots C1 to C5 was relatively linear compared with that of FIG. 9A. The linearity of the first to fifth dots C1 to C5 was about 96%. Referring to FIGS. 9A and 9B, it can be concluded that a highly reliable result in a stability evaluation of the luminescent material according to the present exemplary embodiment may be obtained without manufacturing a TEG device.

According to the above, a polaron state similar to that of a light emitting diode may be formed by applying a constant voltage to a sample. The stability of the luminescent material may be evaluated in an environment similar to a light emitting diode without manufacturing a TEG device. Therefore, the reliability of the stability evaluation of a luminescent material may be improved.

By way of summation and review, as a method of checking a stability or robustness of a luminescent material included in a light emitting layer, a method of manufacturing and operating a test element group (TEG) device may be used. However, evaluation of a luminescent material using a TEG device may involve conditions that differ from those present in a light emitting diode.

Embodiments provide an apparatus to evaluate a stability of a luminescent material in an environment similar to that of a light emitting diode. Embodiments further provide a method of evaluating the stability of a luminescent material in an environment similar to that of a light emitting diode. The method may include irradiating a source light to the luminescent material and measuring an intensity of the light emitted from the luminescent material excited by the source light is used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. An apparatus to evaluate a stability of a luminescent material, the apparatus comprising:
   an electrochemical cell that accommodates a sample including a solvent and the luminescent material mixed in the solvent;
   a voltage application device that applies a constant voltage to the sample;
   a light source that irradiates a source light to the sample; and
   a photoluminescence measuring device that measures a luminescence spectrum of an emission light generated by the luminescent material,
   wherein the constant voltage is at a level sufficient to oxidize the luminescent material.

2. The apparatus as claimed in claim 1, wherein the luminescent material includes a phosphorescent dopant.

3. The apparatus as claimed in claim 1, wherein the luminescent material includes a thermally activated delayed fluorescent dopant.

4. The apparatus as claimed in claim 1, wherein:
   the photoluminescence measuring device includes a spectrometer,
   the luminescent material is excitable by the source light to generate the emission light, and
   the spectrometer measures the luminescent spectrum of the emission light through a path different from a path in which the source light travels.

5. The apparatus as claimed in claim 1, wherein the photoluminescence measuring device includes: a light emitting diode package that excites the luminescent material; and a spectrometer that measures the luminescence spectrum of the emission light.

6. The apparatus as claimed in claim 1, wherein the source light has a peak wavelength within an absorption wavelength range of the luminescent material.

7. The apparatus as claimed in claim 1, wherein the emission light is a blue light, and a peak wavelength of the source light is in a wavelength range from about 400 nm to about 420 nm.

8. The apparatus as claimed in claim 1, wherein the source light is to irradiate to the luminescent material at an intensity from about 10 mW/cm$^2$ to about 20 mW/cm$^2$.

9. An apparatus to evaluate a stability of a luminescent material, the apparatus comprising:
- an electrochemical cell that accommodates a sample including a solvent and the luminescent material mixed in the solvent;
- a voltage application device that applies a constant voltage to the sample;
- a light source that irradiates a source light to the sample; and
- a photoluminescence measuring device that measures a luminescence spectrum of an emission light generated by the luminescent material,
- wherein the electrochemical cell includes a container accommodating the sample, a reference electrode, a working electrode, and a counter electrode, the reference electrode, the working electrode, and the counter electrode being in the container, and the voltage application device includes a potentiostat connected to the reference electrode, the working electrode, and the counter electrode.

10. A method evaluating of a stability of a luminescent material, the method comprising:
- applying a constant voltage to a sample that includes a solvent and the luminescent material mixed in the solvent;
- irradiating a source light to the sample in a state in which the constant voltage is applied to the sample; and
- measuring a luminescence spectrum of an emission light generated by the luminescent material,
- wherein the luminescent material is oxidized by the constant voltage.

11. The method as claimed in claim 10, wherein the luminescent material includes a phosphorescent dopant.

12. The method as claimed in claim 10, wherein the luminescent material includes a thermally activated delayed fluorescent dopant.

13. The method as claimed in claim 10, wherein the luminescent material is excited by the source light to generate the emission light, and the luminescent spectrum of the emission light is measured through a path different from a path in which the source light travels.

14. The method as claimed in claim 10, wherein the emission light is a blue light, and a peak wavelength of the source light is in a wavelength range from about 400 nm to about 420 nm.

15. The method as claimed in claim 10, wherein the source light is irradiated to the luminescent material at an intensity from about 10 mW/cm$^2$ to about 20 mW/cm$^2$.

16. An apparatus to evaluate a stability of a luminescent material, the apparatus comprising:
- an electrochemical cell that accommodates a sample including a solvent and the luminescent material mixed in the solvent;
- a voltage application device that applies a constant voltage to the sample;
- a light source that irradiates a source light to the sample; and
- a photoluminescence measuring device that measures a luminescence spectrum of an emission light generated by the luminescent material,
- wherein measuring the luminescence spectrum of the emission light is performed in a state in which the constant voltage and the source light are removed from the sample.

* * * * *